(12) United States Patent
Davis

(10) Patent No.: US 7,281,030 B1
(45) Date of Patent: Oct. 9, 2007

(54) METHOD OF READING A REMOTE MEMORY

(75) Inventor: Arlin R. Davis, Yamhill, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/397,850

(22) Filed: Sep. 17, 1999

(51) Int. Cl.
G06F 15/16 (2006.01)
(52) U.S. Cl. .................. 709/212; 709/216; 710/22
(58) Field of Classification Search ............... 709/212, 709/213, 214, 215, 216; 710/22, 24
See application file for complete search history.

(56) References Cited

U.S. PATENT DOCUMENTS

| | | | | |
|---|---|---|---|---|
| 4,543,627 A | * | 9/1985 | Schwab | 709/212 |
| 4,922,416 A | * | 5/1990 | Krishnan et al. | 709/212 |
| 5,093,780 A | * | 3/1992 | Sunahara | 709/212 |
| 5,761,534 A | * | 6/1998 | Lundberg et al. | 710/50 |
| 5,884,313 A | * | 3/1999 | Talluri et al. | 707/10 |
| 5,909,546 A | * | 6/1999 | Osborne | 709/212 |
| 6,052,387 A | * | 4/2000 | Chow et al. | 370/471 |
| 6,078,733 A | * | 6/2000 | Osborne | 709/212 |
| 6,219,583 B1 | * | 4/2001 | Kinoshita et al. | 700/3 |
| 6,226,680 B1 | * | 5/2001 | Boucher et al. | 709/230 |
| 6,240,095 B1 | * | 5/2001 | Good et al. | 370/412 |
| 6,347,337 B1 | * | 2/2002 | Shah et al. | 709/224 |
| 6,424,591 B1 | * | 7/2002 | Yu et al. | 365/230.09 |
| 6,457,072 B1 | * | 9/2002 | Fairman | 710/22 |
| 6,460,080 B1 | * | 10/2002 | Shah et al. | 709/224 |
| 6,510,164 B1 | * | 1/2003 | Ramaswamy et al. | 370/466 |

* cited by examiner

Primary Examiner—Ario Etienne
Assistant Examiner—Barbara Burgess
(74) Attorney, Agent, or Firm—Kenyon & Kenyon LLP

(57) ABSTRACT

In an example embodiment, a method of reading data from a remote device transfers data directly from the remote memory of the remote device to the local memory of the local device. A message is sent from the local device to the remote device which includes a transport header indicating the message type of the message. The remote device processes the message to determine whether or not the transport header of the message identifies the message as a type of remote Direct Memory Access (rDMA) read operation. If the message is that type of remote Direct Memory Access (rDMA) read operation, then the remote device performs a remote Direct Memory Access (rDMA) write operation to the local device in accordance with data elements included in the message.

24 Claims, 9 Drawing Sheets

METHOD OF READING A REMOTE MEMORY

BACKGROUND

1. Field of the Invention

This invention relates generally to methods and apparatus for transferring data between network devices. In particular, the present invention relates to methods and apparatus for reading a remote memory across a network.

2. Description of the Related Art

Conventional servers typically have multiple input/output (I/O) controllers, each supporting at least one I/O device, and a memory mapped load/store configuration. In the example of FIG. 1, there are a plurality of central processing units $CPU_1$–$CPU_n$, a host system bus and a system memory SM connected to the host system bus via a memory controller MC. An I/O bridge connects the memory controller MC to an I/O bus such as, for example, a Peripheral Component Interconnect (PCI) synchronous bus as described in the latest version of "PCI Local Bus Specification, Revision 2.1" set forth by the PCI Special Interest Group (SIG) on Jun. 1, 1995. Connected to the I/O bus are an I/O controller A (usually implemented as a slot-based adaptor card) for a hard disk (not shown), an I/O controller B (usually implemented as a slot-based adaptor card) for a CD-ROM drive (not shown) and a network interface controller (NIC).

Suppose, for example, that $CPU_1$ wishes to transfer data to the hard disk via I/O controller A as shown in FIG. 2. $CPU_1$ first stores the write command and its associated data within a block within the system memory SM. $CPU_1$ transfers a command to the I/O controller A via a path over the system bus, I/O bridge, and I/O bus. This tells the I/O controller A that a new command has been issued. I/O controller card A must then read the data from system memory SM using a pointer, which is the value representing an address within the system memory SM where the data associated with the command can be found. (The pointer may be virtual or physical and the location of the data is not necessarily contiguous with the location of the command. Indeed, the data may be split, requiring a Scatter/Gather List (SGL) to describe the locations of the data.) To get the block of data from the system memory SM back to I/O controller A may require several separate fetches. The data is then subsequently written from the I/O controller A to the hard disk HD. The CPU, must always load the data and the I/O controller must always separately read the write command to know where the data is located and perform the fetches to obtain the data. A similar load/store procedure occurs when a CPU reads a block of data from the hard disk, i.e., the I/O controller A would store the block of data in a block within the system memory SM, then pass an indication to the CPU that the read process from the hard disk HD has been finished, whereupon the CPU must separately access the block within the system memory SM to obtain the data.

This conventional load/store procedure (illustrated generally in FIG. 3) of sending a command with pointer (step 1), waiting for and receiving a request for data (step 2) and subsequently sending the data in response to the request (step 3) has substantial inherent latencies and delays. Even though the CPUs perform optimally, the performance of the server can still be less than optimum because the procedure is very inefficient. The data transfers slow down the entire system and many CPU cycles will pass before they are completed. Although, the PCI bus architecture provides the most common accepted method used to extend computer systems for add-on arrangements (e.g., expansion cards) with new disk memory storage capabilities, it has performance limitations and scales poorly in server architectures. Furthermore, a server may have a significant number of I/O devices which are of radically different types, store different kinds of data and/or vary from each other in the addressing sequence by which the data blocks containing the data are written and read out.

A data transfer from another device across a network is similarly made without direct reference to the system memory. A network interface controller (NIC) acts as the communications intermediary between the device and the network and passes data blocks to and from the network in the speed and manner required by the network. The data transfer between the devices over the network is virtualized into a pair of starting and ending points corresponding to the NIC for each of the devices. Other parts of the devices, such as the I/O controllers and memory controller which controls the writing and reading of the transferred data blocks to and from the device memory, are not involved when the data is transferred between the NICs across the network. Furthermore, although not shown in FIGS. 1 and 2, transport and other protocols (e.g., TCP, IP) are implemented at various levels of firmware and software in the device to control, distinguish or review the transferred data in order to render the transfer of data over the network more reliable. The multiplexing and demultiplexing processes are computationally expensive and a CPU must control the movement of the transfer data blocks into and out of the memory controller or I/O controller during the transfer of each data block. Also, an intermediate copy of the data must be made in the hardware of the memory controller or I/O controller and at other levels or layers, mode switches and context switches of the device.

SUMMARY

The present invention is directed to the transfer of data between network devices. In an example embodiment, a method of reading data from a remote device transfers data directly from the remote memory of the remote device to the local memory of the local device. A message is sent from the local device to the remote device which includes a transport header indicating the message type of the message. The remote device processes the message to determine whether or not the transport header of the message identifies the message as a type of remote Direct Memory Access (rDMA) read operation. If the message is that type of remote Direct Memory Access (rDMA) read operation, then the remote device performs a remote Direct Memory Access (rDMA) write operation to the local device in accordance with data elements included in the message.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation.

DETAILED DESCRIPTION

Figure 1:
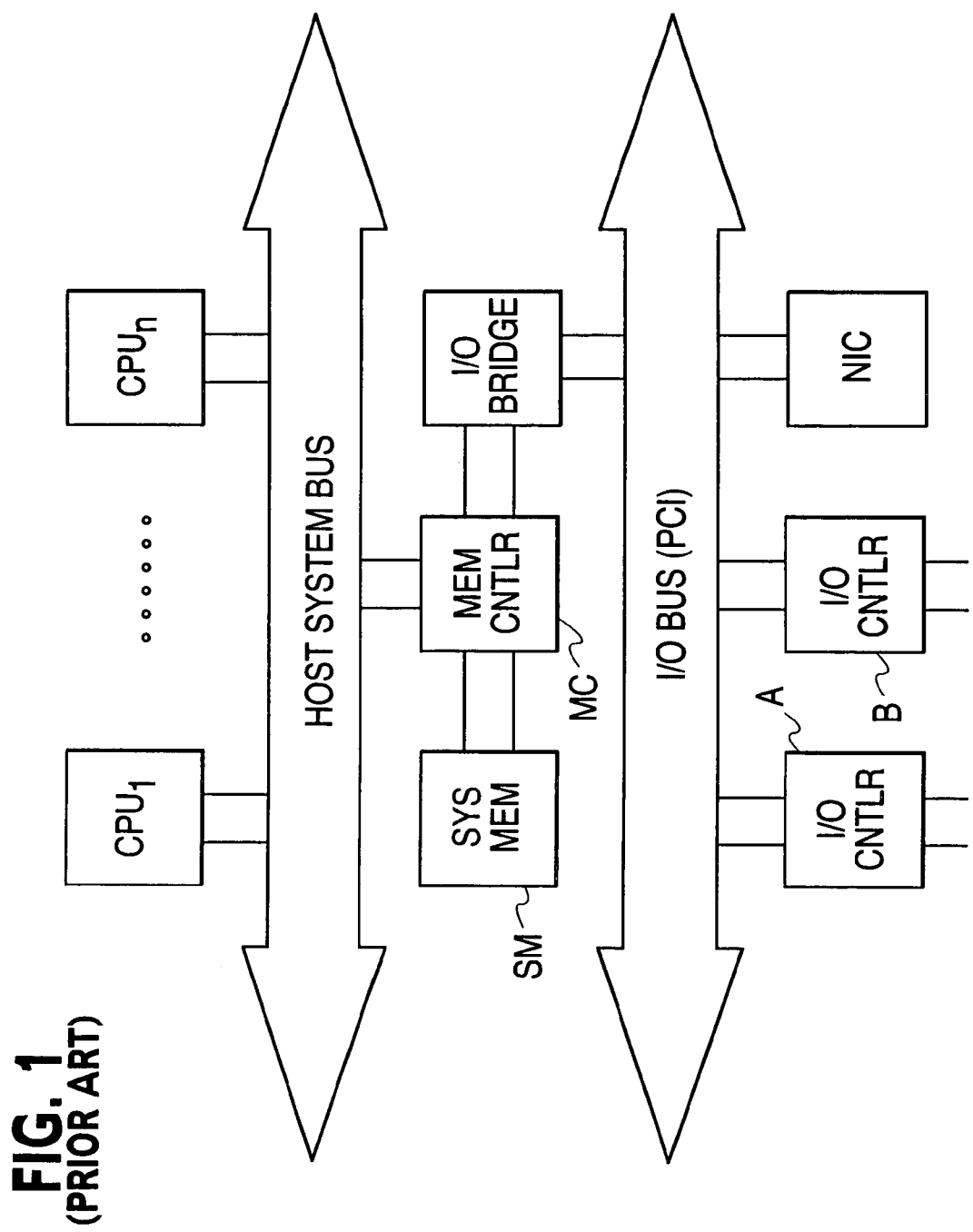
FIG. 1 is a generalized block diagram providing a basic illustration of a server architecture having a conventional memory mapped load/store configuration.
Figure 2:
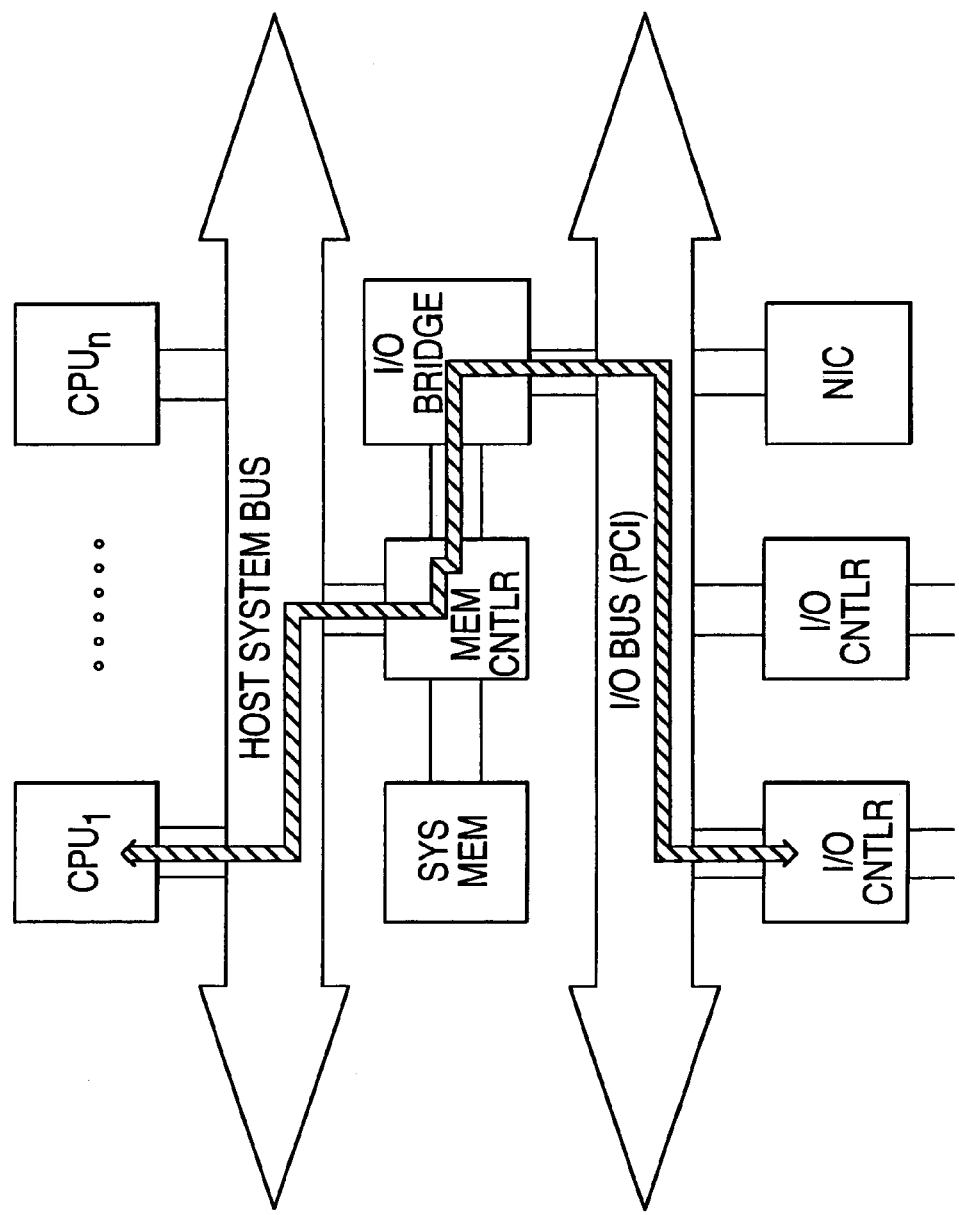
FIG. 2 is a block diagram of the conventional server architecture showing the transfer of data blocks between a CPU and a hard disk.
Figure 3:
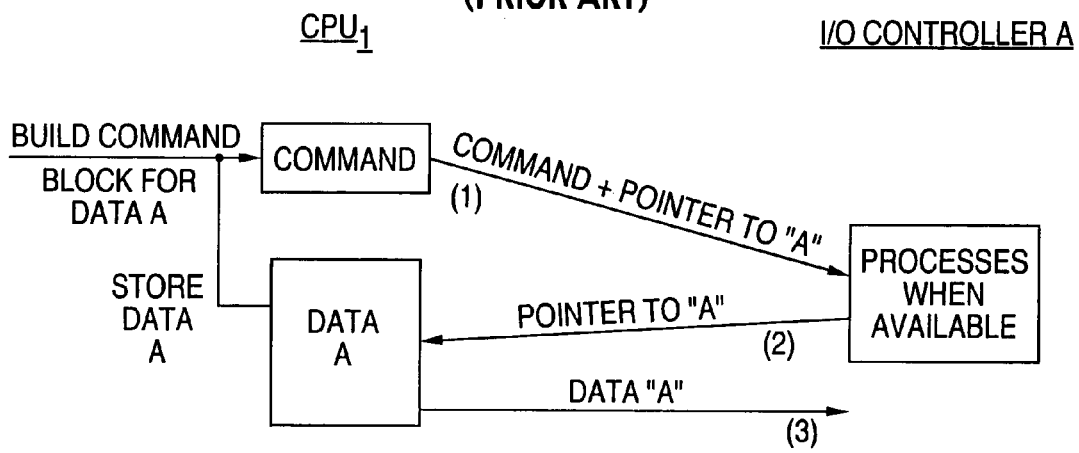
FIG. 3 is a chart illustrating the steps of a conventional load/store I/O operation in which an I/O data block is transferred from a device on a network.

For the reasons discussed in the Description of the Related Art, it is desirable for a device NIC to be able to push data across into a shared buffer pool of another device and direct the data into and from the device's memory. An example embodiment of the present invention seeks to decrease the inefficiencies of the transfer of I/O data to input/output devices in a server architecture, such as what occurs when an I/O data block is transferred to or from a mass storage I/O device such as a hard disk. In particular, PCI compliant I/O adapters cannot accomplish data transfers without the multiple steps discussed above. A server is a type of computer system having an architecture or otherwise designed to be able to support multiple I/O devices and to transfer data with other computer systems at high speed. (Due to recent advances in the performance and flexibility of computer systems, many modern computers are servers under this definition.) Although many servers currently utilize PCI buses, the example embodiment of the invention set forths a data transfer where the transferee device has remote direct memory access (RDMA) to virtual addresses, thus enabling protected, target-managed data transfer.

The example embodiment discloses a method which optimizes the transfer of I/O data blocks to reduce latency when one device attempts to read data from the remote memory of a remote device into its local memory either for the execution of instructions or the storage of the data. For a disk drive, for example, the data block is the unit of addressing and data transfer. If the value of one byte is to be updated on a disk, then the data transfer would include a block of data (512 bytes, for example) that contains the byte of interest. The byte value in the copy of the block held in memory would be updated, and then that block would be transferred from memory to the drive, overwriting the old block stored on the disk. However, the method according to the example embodiment is not limited in its application to disk drives or I/O storage devices. In particular, the method according to the example embodiment may be useful for transferring data among computers and other devices on a network since data latency is generally critical in such environments. The data may be transferred in blocks of different sizes depending upon, for example, the target device, the transfer protocol (such as, for example, ethernet packets), etc.

One example application of the invention is in a network interface controller (NIC) or chipset incorporated in the I/O unit of a server device configured to operate in conjunction with one or more processors, such as the Intel Pentium II Xeon™ or Pentium III Xeon™ processor. However, such an embodiment is but one possible example of the invention which may, of course, be applied in any computer having a processor and an input/output device and indeed in any server architecture where an improvement in writing and reading data blocks to or from an I/O device is desired for whatever reason.

An implementation of the example embodiment of the invention is in a host server architecture in a system area network (SAN) with a switched fabric configuration. There are several commercially available proprietary SAN fabrics, such as GigaNet and ServerNet by Compaq, however they do not support rDMA read methods. Therefore, the example embodiment uses a Next Generation I/O (NGIO) architecture allowing remote direct memory access in compliance with the NGIO standard, Version 1.0, published Jul. 22, 1999. The NGIO architecture includes a fabric cluster based networking medium with new link specifications for a network of servers. It utilizes remoted I/O devices out on a System Area Network (SAN) fabric rather than I/O controllers and devices on system level I/O buses, such as PCI. NGIO is also more reliable because the I/O and server domains are separate and the CPU domains the I/O. Fault domains are separate so I/O devices going down will not necessarily affect the CPU infrastructure and memory buses. (This application of the method and apparatus of the invention is exemplary only. The method and apparatus of the invention are also applicable to non-switched point-to-point connection links in other configurations or networks such as System I/O.)

Figure 4:
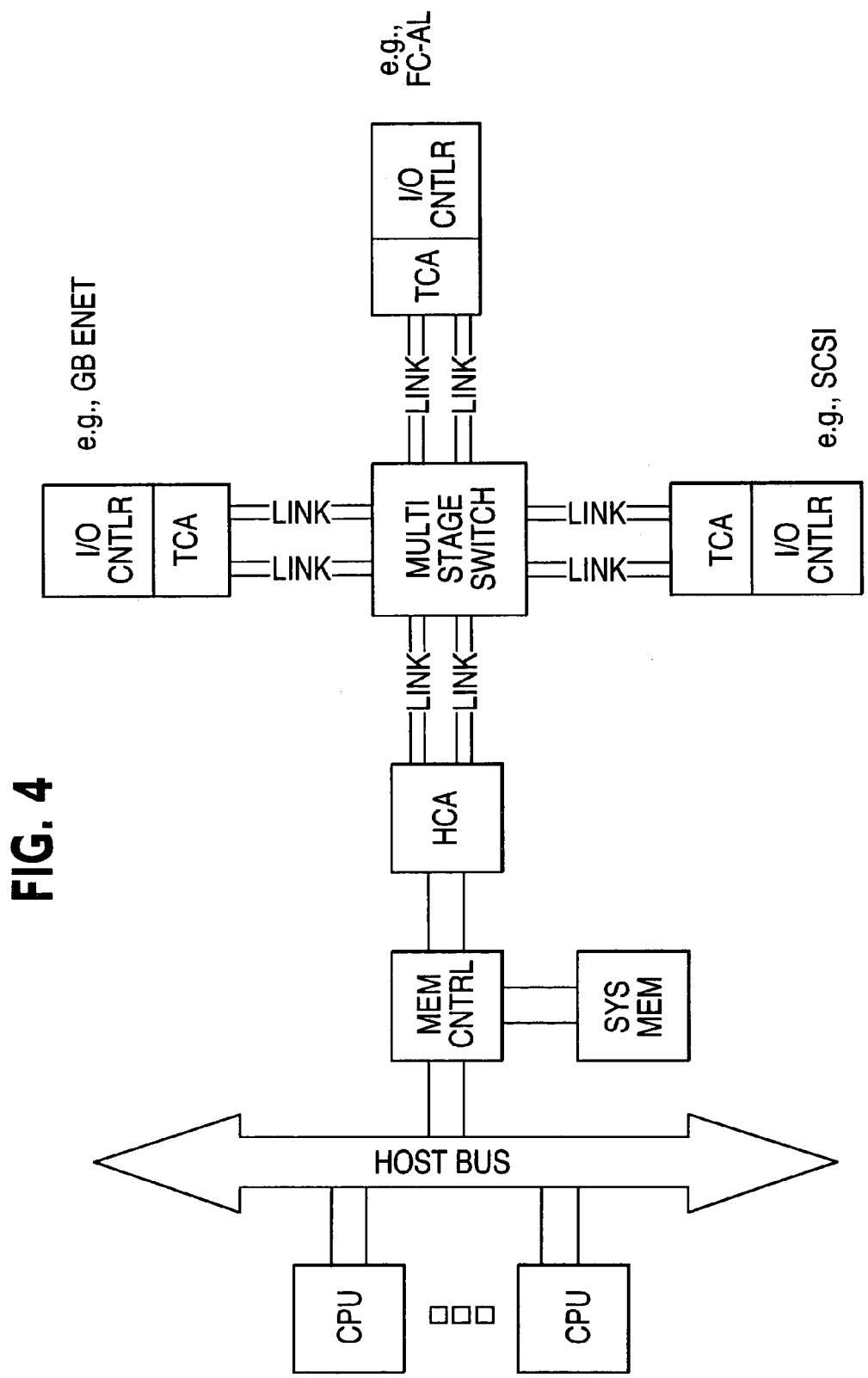
FIG. 4 is a diagram illustrating a server architecture in which a method according to an example embodiment of this invention may be advantageously performed.

The example embodiment of a server architecture might be as shown in FIG. 4. Of course, a server can operate as a host as shown when initiating a data transfer or it can operate as a target device when receiving a data transfer initiated by another device. It is shown as a host having a plurality of CPUs such as an Intel Pentium II Xeon™ or Pentium III XEON™ processor, a host system bus, a memory controller, system memory, and an I/O unit containing a host channel adapter (HCA). The CPUs and memory controller of the host may be connected along the host system bus as shown in FIG. 4. The external data transfers are optimized through the host channel adapter (HCA) of the I/O unit at all times. The data transfer methods are available in NGIO. They may also be available in other suitable architectures which are currently existing or later become available, such as System I/O. The commands and I/O data move through the host independently of the CPU. This helps the CPU or other elements of the host avoid having to expend system resources to accomplish transfer of I/O data blocks since there may be access conflicts with other functions.

The host channel adapter of the I/O unit, in turn, is connected to a switching fabric SF, which may contain many different switches SW. The switches are preferably multi-stage switches with naturally redundant communication channel links through the fabric such that a plurality of messages can be traveling through the switching fabric at any given time. Each channel link between the HCA and the switches includes a request/response protocol permitting message sends, rDMA read and write, management and retry on transient errors. The channel links may be grouped together for additional bandwidth. On the other side of the link from the host channel adapter, a target channel adapter (TCA) adheres to all link semantics. The TCA is a subset of a HCA and utilizes an appropriate interface (e.g., Gigabit Ethernet, SCSI, FC-AL, etc) to the I/O controller in the target device.

Accordingly, when a CPU issues a read command, for example, it simply passes the command to the host channel adaptor which injects it into the switched fabric SF, such that the CPU does not have to wait for processing of the and locking of the system bus, but instead goes on to perform other processing operation until the processing is completed. According to the present invention, the channel link is any means of transferring data, including but not limited to virtual channels, used to transfer data between two endpoints.

While the example embodiment is an NGIO implementation and thus supports the channel link definition provided in the specification identified above, the present invention is not so limited. In accordance with the implementation in the NGIO specification or similar systems, once injected into the switched fabric SF, the write command travels through the switches and eventually arrives at a target channel adapter TCA where it can be given to an I/O controller where it is subsequently written to the hard disk HD or to a network interface where it is subsequently transferred to another computer device on a connected network (not shown). Accordingly, the inherent delays in deciphering the command and writing of the data as required by the I/O controller are not experienced by the processor P which is on the other side of the switching fabric, and can continue processing. As shown in FIG. 4, the message passing configuration can contain a plurality of channel adapters CA and host servers connected to the switching fabric SF, such that there can be a multitude of different messages traveling through the fabric and where all of the hosts can continue operating while their messages are traveling through the switching fabric. The example embodiment of the invention described in this application is implemented in a hardware device compliant with the Next Generation I/O (NGIO) architecture. The example embodiment and other embodiments of the invention can be implemented in conjunction with other types of switch fabric-based I/O architectures. The example embodiment NGIO uses a similar model for input/output data transfer as is specified by the VI architecture. A highly efficient interface such as the kernel interface in the example embodiment may thus be beneficially used by various computer devices having NGIO hardware connected to a network fabric. However, the example embodiment and other embodiments of the invention may also be used with non-NGIO hardware.

Conventional network interface controllers do not support rDMA read methods. The exemplary embodiment of the invention therefore provides a new method of rDMA read request processing. This rDMA read technique provides an I/O communication mechanism that allows a remote attached I/O device to read remote host memory with minimal host-side CPU involvement. It employs a simple transport protocol between the host-side requesting I/O data transfers and the device-side performing the I/O data transfer operations. The method provides for remote Direct Memory Access (rDMA) write and immediate data services to be utilized by the host-side to provide the necessary I/O data transfer and completion notification. The remote read processing is performed with new software techniques that are described in detail below.

To initiate a rDMA read request, a device-side driver provides a set of source buffers, which reference the remote host-side memory, and a set of destination buffers that reference the local device-side memory. These buffers are pre-registered with their respective network interface controller (NIC) before the read request is initiated. The remote read mechanism allows these buffers to be specified as multiple data segments with offsets and a channel designation, which indicates the data path. The rDMA Sequence field is used to specify the last data segment and completion of the rDMA read request.

Figure 5:
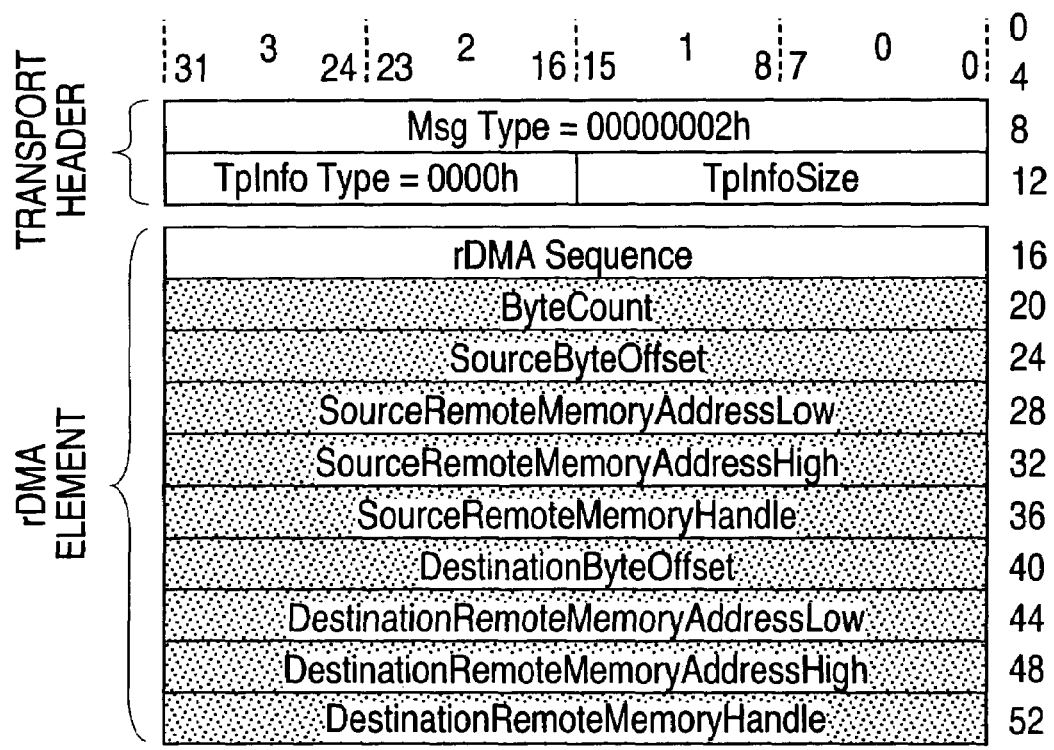
FIG. 5 shows the structure of the data elements in the transport protocol of a rDMA read message according to an example embodiment of the invention.

The rDMA read request interface describes the data transfer from the host source buffers to the device destination buffers by using rDMA elements. The rDMA elements are embedded in a lightweight transport message that is identified by a unique header type and is recognized by the host-side as a rDMA read request. These rDMA elements along with the transport header, which specify both the type (TpInfoType) and count (TpInfoSize), are illustrated by FIG. 5. After receiving the rDMA read request, the host-side will schedule rDMA write transactions that are directed back to the device-side in order to complete the request. This rDMA read request is illustrated by FIG. 6.

Figure 6:
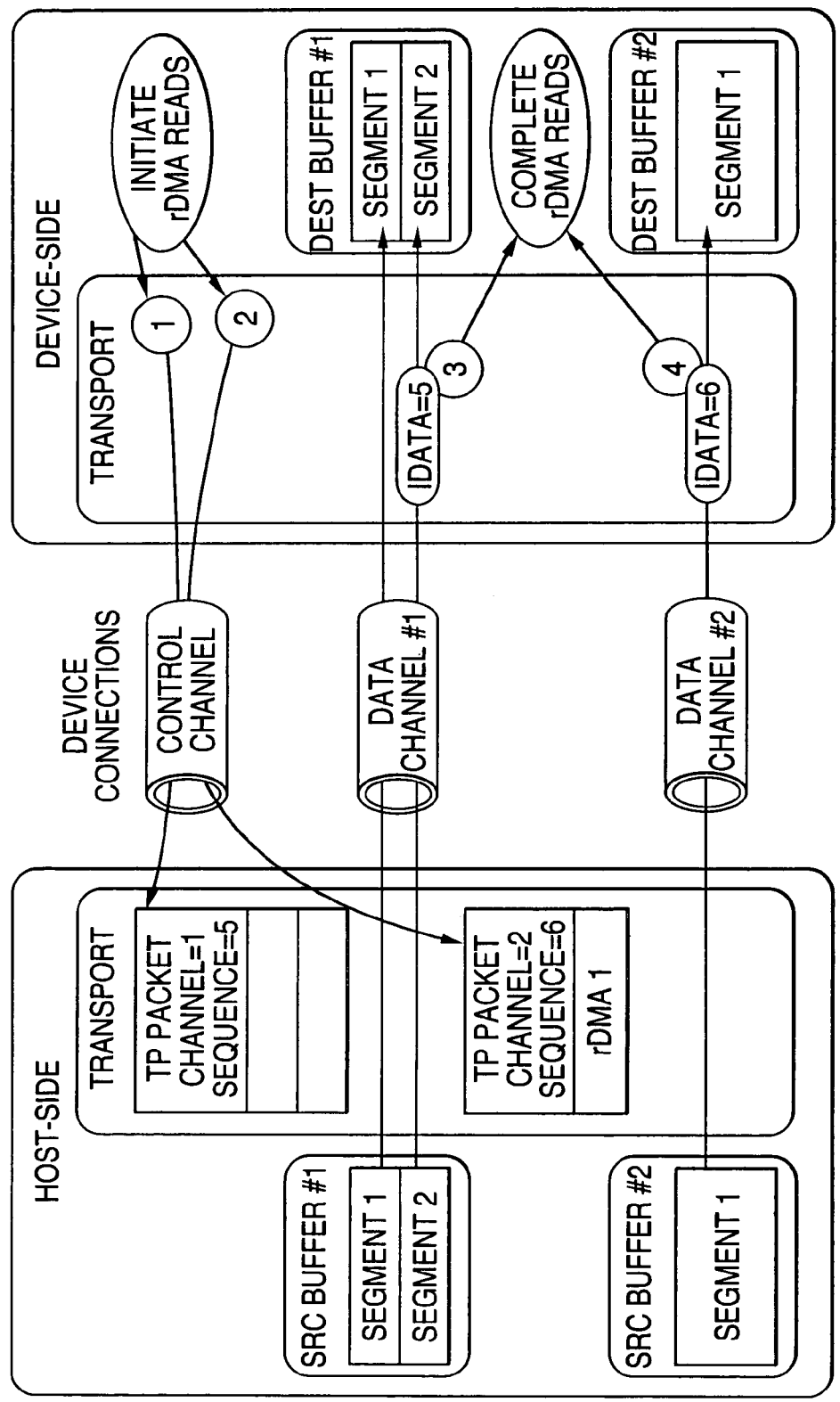
FIG. 6 illustrates the processing of rDMA read messages according to an example embodiment of the invention.

Two separate initiated rDMA read requests are shown in FIG. 6 to help illustrate the design of the new rDMA read method. This example highlights the use of multiple segments to support scatter/gather and the use of multiple data channels that multiplex separate rDMA read transfers. The first rDMA read request (step 1) is scheduled for Data Channel 1 and the second rDMA read request (step 2) is schedule for Data Channel 2 to avoid blocking and optimize performance. The rDMA read mechanism identifies each rDMA read with a unique sequence that will be used to complete the read request. The rDMA mechanism on the host-side recognizes the incoming packets on the control channel as embedded rDMA read requests and builds the proper rDMA write descriptors with the proper sequence inserted into the immediate data field on the last segment of each rDMA read request. The rDMA read completion for both requests are processed on the device-side, based on the immediate data that arrives with the last data segments (steps 3 and 4) of each rDMA transfer. This immediate data eliminates the need for the host-side to send a data transfer acknowledgement packet back to the device-side.

The example embodiment provides the capability for multiple data segments and strict in-order delivery across each channel. The multiple data segments give I/O devices an efficient mechanism to support a typical scatter/gather list of data buffers. The in-order scheduling of the rDMA read across each channel provides a guarantee of data transfer ordering. There is no need to acknowledge the completion of the rDMA write in the exemplary embodiment since it utilizes immediate data services. The rDMA write completion is identified with a sequence and end of data context. Thus, the receiving I/O unit can immediately identify the completing rDMA read request without waiting for an acknowledgement packet from the host. This method eliminates an acknowledgement packet and also provides a very fast completion mechanism on the I/O unit of the receiving I/O device. Accordingly, a substantial portion of the previous inherent delays are avoided, thus achieving the advantages of the present invention.

The example embodiment allows multiplexed rDMA read transactions to occur across multiple channels to provide optimum performance and eliminate possible blocking conditions. This method gives the I/O device the flexibility to separate the large and small data transfers so that small data transfers will not be blocked behind large transfers. As shown in FIG. 6, there is one control channel and two data channels. Alternatively, a single channel may be used to transmit the rDMA read message and the data across the channel adapters. Such arrangement is advantageous in that there is only a single channel, but is disadvantageous in that if a huge block of data (e.g., 2 gigabytes) is to be transmitted, such huge data block transmission will tie up the single channel, thus blocking all other messaging which can continue to operate and transmit messages across the fabric. Dual channels are generally more advantageous in that bulk data or left-over data transmission will never tie up the messaging channel.

There may also be a plurality of different data channels. With such arrangement, left-over data of a rDMA write operation can be sent over another one of the data channels. Such is advantageous in that only one data channel will be tied up transmitting any bulk or left-over data. In contrast, multiple channels can be used in parallel for faster transmission of the bulk or left-over data. More specifically, the bulk or left-over data can be striped into equally sized blocks and transmitted over various channels.

There are different possible points in the server architecture to implement the method of the present invention. The first possible implementation is in software at the NIC of the I/O device. This implementation supports the currently available NICs which do not support the NGIO standard by allowing an NGIO communication link to be emulated in software. An example implementation of the invention uses such NICs because they are freely available and less expensive than NGIO hardware. Preferably, the method is implemented as firmware, and accelerated with hardware support. A network may of course have I/O devices implementing different embodiments of the invention.

Optimal rDMA read capabilities requires a well-defined communication interface. Therefore, another exemplary embodiment of the invention utilizes the communication interface defined by the Virtual Interface (VI) Architecture. Specifically, a preferred implementation of the example embodiment is in the NIC or other input/output control circuit of a server or other network device having VI enabled hardware, as well as a processor such as the Intel Pentium II Xeon™ or Pentium III Xeon™ processor. However, such an implementation is but one possible application of the example embodiment which may, of course, be applied in any device having a processor and an input/output circuit and indeed in any server architecture where an improvement in the speed of communications with a network is desired for whatever reason.

Figure 7:
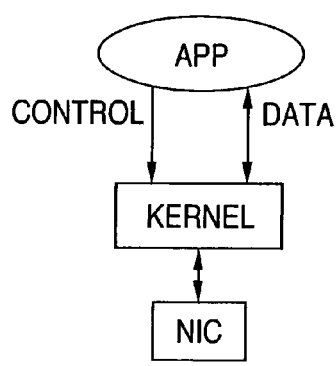
FIG. 7 is a generalized block diagram showing the data transfer processing in a prior art network.
Figure 8:
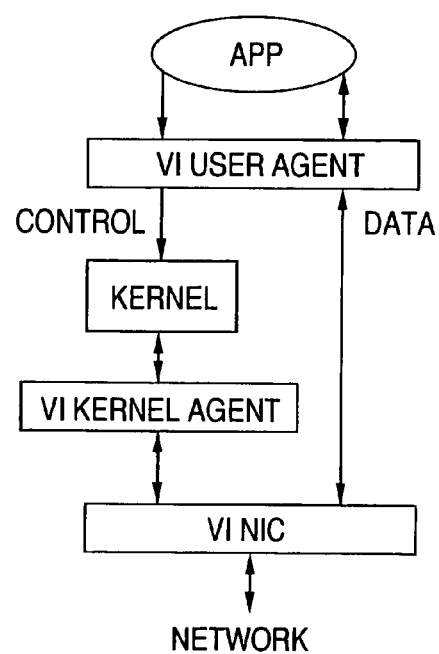
FIG. 8 is a generalized block diagram showing the VI architecture with which an example embodiment of the present invention may be used.

The centralized data transfer processing of the prior art (see FIG. 7) prohibits data transfers from realizing the potential raw hardware performance offered by underlying high-speed networks. Tthe Virtual Interface (VI) Architecture (see FIG. 8) enables distributed applications to perform low overhead communication over System Area Networks (SANs), which are high-bandwidth, low-latency networks interconnecting nodes within a distributed computer system. VI is described in the Virtual Interface Architecture Specification, Version 1.0, Dec. 16, 1997, jointly authored by Intel Corporation, Microsoft Corporation, and Compaq Computer Corporation, and makes it possible to perform low overhead communication using off-the shelf SAN hardware. The Virtual Interface architecture specification defines a standard interface to a SAN controller such that user applications and kernel applications can move data out onto a SAN with minimal impact on the CPU. It is designated for use in networks, such as SANs, which have very low error rates and high reliability levels. Transport errors are rare and considered catastrophic. The connection is broken when they occur.

Before the example embodiment of the present invention will be described in detail, the basic VI Architectural model will first be described with reference to FIG. 9. As will become apparent, the VI architecture provides direct data access to the network interface hardware in a fully protected fashion. It thus avoids intermediate data copies and bypasses the operating system in order to achieve low latency, high bandwidth, data transfer.

Figure 9:
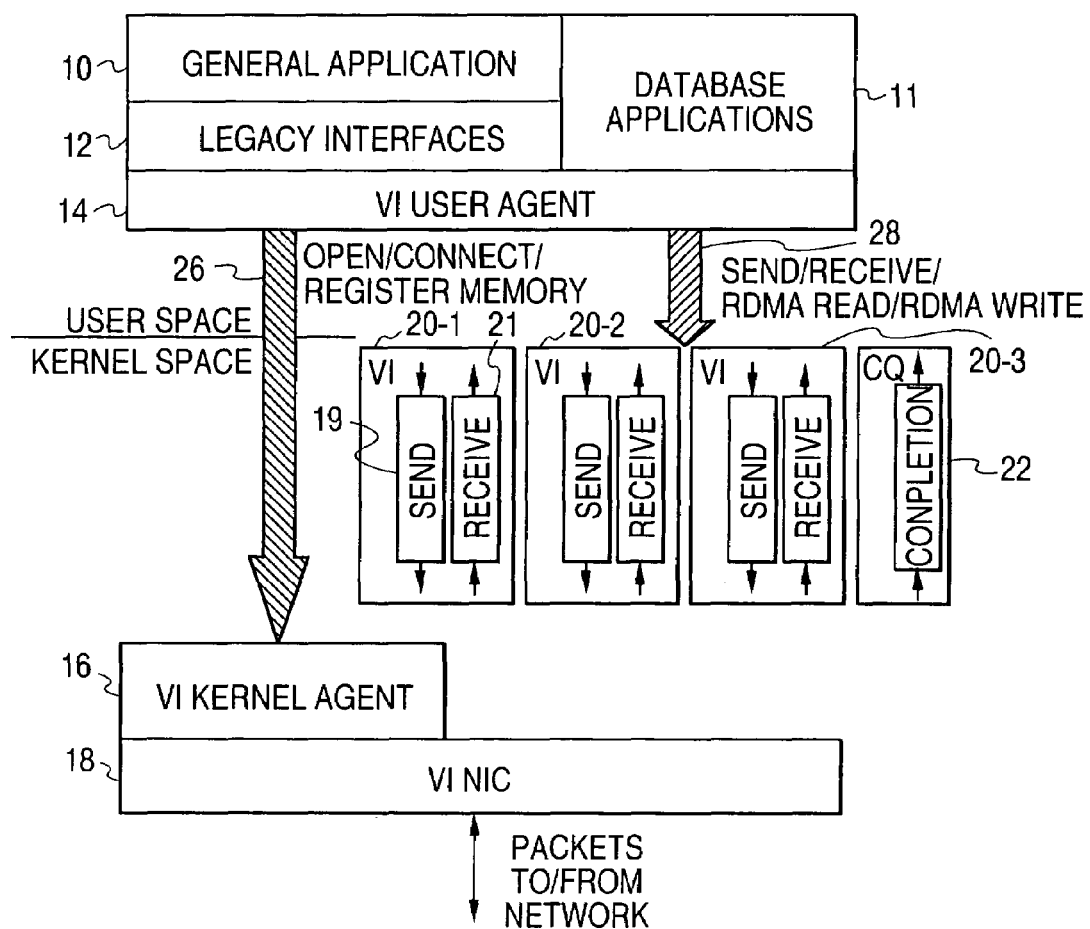
FIG. 9 is a block diagram of the VI architectural model.

As shown in FIG. 9, the VI Architectural model includes several different Virtual Interfaces (VIs) 20-1 to 20-3 between a VI user agent 14 and a VI network interface controller (NIC) hardware 18 (such as the GNN1000 of the cLAN product family, available from GigaNet, Inc.). The VI user agent 14 provides communications for software processes through a VI. The software processes may include general application programs 10 using legacy interfaces 12 (for example, an operating system communications facility such as, e.g., Sockets, Remote Procedure Call or RPC, MPI) between the general application programs 10 and VI user agent 14. The software process may also be application programs 11, such as database applications in the example of FIG. 9, which do not need legacy interfaces 12.

Figure 10:
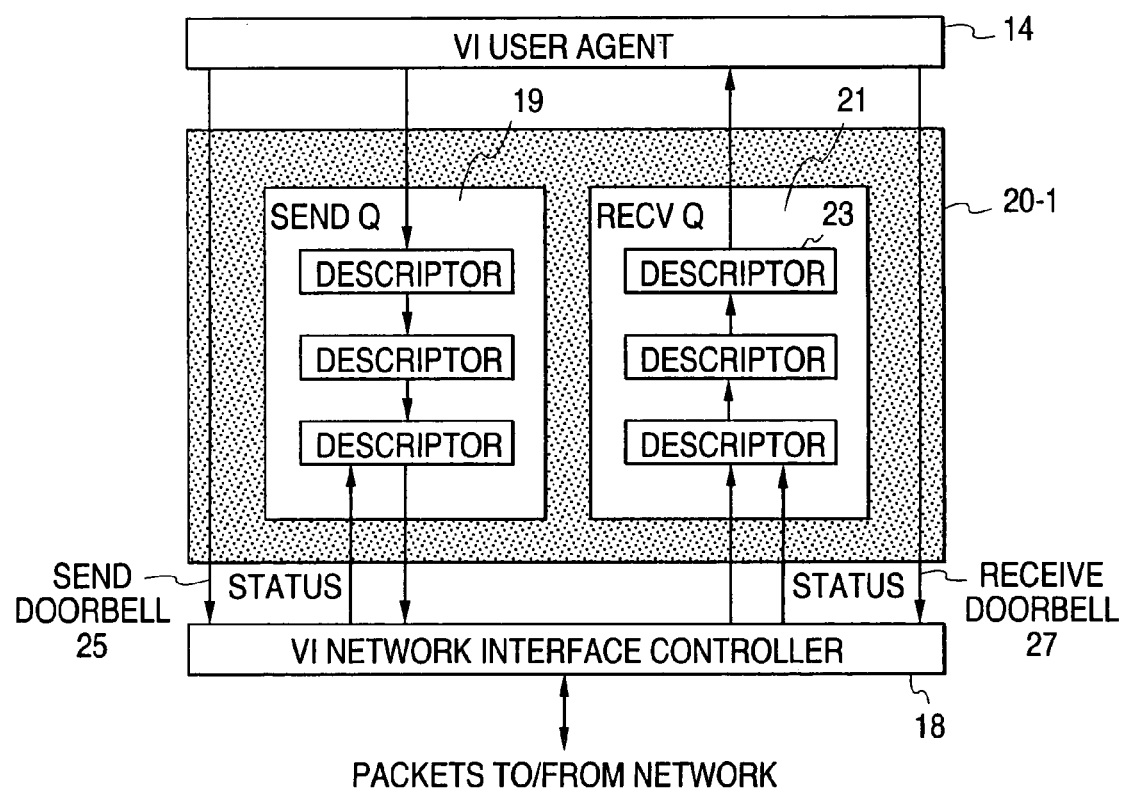
FIG. 10 is a block diagram of the virtual interface in the VI architecture model.

Each one of the VIs 20-1 to 20-3 in FIG. 9 can have the details shown in FIG. 10. (Only VI 20-1 is shown for the sake of simplicity.) VI 20-1 is configured to directly access the process' memory for data transfer operations between the software application and the network. In particular, it includes a pair of work queues, one for send operations (a send queue 19) and one for receive operations (receive queue 21). The work queues store one or more descriptors 23 between the time it is Posted (placed in the queue) and the time it is Done (when the VI NIC 18 has completed processing it). The descriptor 23 is a data structure recognizable by the VI NIC 18 that describes a data movement request, and it includes a list of segments (a control segment, an optional address segment and one or more data segments). The control segment identifies the type of VI NIC 18 data movement operation to be performed and the status of a completed NIC data movement operation. The data segment describes a communications buffer for a VI NIC 18 data movement operations. A receive queue 21 contains descriptors that describe where to place incoming data. A send queue 19 contains descriptors that describe the data to be transmitted. A pair of VIs are associated using connection primitives (e.g., VipConnectWait, VipConnectAccept, VipConnectRequest) to allow packets sent at one VI to be received at the other VI. A send doorbell 25 is provided for allowing the user software process or application to notify the VI NIC 18 that work (a descriptor describing a requested data transfer operation) has been placed in send queue 19 and to request that the VI NIC 18 start the data transfer operations described by the descriptor placed in send queue 19. On the other hand, the receive doorbell 27 is not used to initiate data transfers. It is used simply to supply buffers for incoming data, such as message sends or immediate data provided with inbound rDMA transfers, according to descriptors in receive queue 21.

Referring to FIG. 9 again, the VI user agent 14 is a software component that enables legacy interfaces 12 and database applications 111 to utilize VI NIC 18. The VI user agent 14, in part, abstracts the details of the underlying VI NIC 18 hardware in accordance with API(s) defined by the legacy interfaces 12. The APIs in VI user agent 14 primarily focus on providing primitives for synchronous communication with the VI hardware; the asynchronous operations being facilitated by means of callbacks as discussed in the Description of the Related Art above. The VI user agent 14 includes a library of primitives, known as the Virtual Interface Primitives Library (VIPL) which receives commands from legacy interfaces 12 and provides one or more functions corresponding to each command. The functions include those for creating a VI (VipCreateVI), for destroying a VI (VipDestroyVI), for connecting one VI to another VI (e.g., VipConnectWait, VipConnectRequest), for accepting or rejecting a VI connection request (VipConnectAccept or VipConnectReject), for terminating or disconnecting a connection between two VIs (VipDisconnect), to allow a process to register process memory with a VI NIC (VipRegisterMem), to post descriptors (to place a descriptor in a VI work queue using, e.g., VipPostSend, VipPostRecv), etc. Existing APIs to VI are targeted to user level applications. Details of the VI primitives (VIPL) are set forth in the VI Architecture Specification, version 1.0, Dec. 16, 1997 and the Virtual Interface (VI) Architecture Developer's Guide, Revision 1.0, Sep. 9, 1998.

The VI kernel agent 16 is the privileged part of the device's operating system, usually a driver supplied by the vendor of VI NIC, that performs the setup and resource management functions needed to maintain a virtual interface. These functions include the creation/destruction of V's, VI connection setup/teardown, interrupt management and or processing, management of system memory used by the VI NIC 18 and error handling. In the model, VI kernel agent 16 is accessed using the standard operating system mechanisms such as system calls. As shown by arrow 26 (FIG. 9), the legacy interfaces 12 make system calls to the VI kernel agent 16 to perform several control operations, including to create a VI on the local system, to connect the local VI to a VI on a remote system, and to register memory. The user software process or application must register memory to be used for data transfer prior to submitting the request for data transfer. The memory regions used by descriptors and data buffers are registered prior to data transfer operations. Memory registration gives a VI NIC 18 a method to translate a virtual address to a physical address. The user receives an opaque memory handle as a result of memory registration. This allows a user to refer to a memory region using a memory handle/virtual address pair without worrying about crossing page boundaries and keeping track of the virtual address to tag mapping. Memory registration enables the VI NIC 18 to transfer data directly between the registered buffers and the network. Traditional network transports often copy data between user buffers and one or more intermediate kernel buffers. Thus, processing overhead is decreased in the VI Architecture because data transfers between the user software process or application and VI NIC 18 do not rely on system calls to the kernel.

After creating a VI on the local system, connecting the local VI to a remote VI and registering memory, legacy interfaces 12 or database applications 11 can use data transfer primitives of the VIPL library of VI user agent 14 to send and receive data. The VI Architecture defines two types of data transfer operations: 1) traditional send/receive operations, and 2) Remote-DMA (RDMA) read/write operations. Once a connection is established, the legacy interfaces 12 or database applications 11 post the application's send and receive requests directly to the local VI (to the send and receive queues 19 and 21). They then post descriptors (e.g., place the descriptors in a work queue) and ring a doorbell to notify the VI NIC 18 that work has been placed in the work queue. The doorbell can be rung (notify the VI NIC 18 of the work in the queue) without kernel processing. The VI NIC 18 then processes the descriptor by sending or receiving data, and then notifies the legacy interface 12 or database application 11 of the completed work using the completion queue 22. The processing of descriptors posted on a VI is performed in FIFO order but there is no implicit relationship between the processing of descriptors posted on different VIs. The VI NIC 18 directly performs the data transfer functions in response to the posted descriptors. This process removes the strict ordering between software layers in conventional network devices so that once the communication channel is established, the data is transferred more quickly.

The VI Architecture supports three levels of communication reliability at the NIC level: unreliable delivery, reliable delivery, and reliable reception. With reliable delivery and reception, corrupt data is detected, data is delivered exactly once, data order is guaranteed, data loss is detected and the connection is broken upon detection of an error. While providing high reliability, the VI architecture does not perform other transport level functions, including flow control, buffer management and fragmentation and reassembly. The VI Architecture Specification, version 1.0, Dec. 16, 1997 states at page 15 that "VI consumers are responsible for managing flow control on a connection." The transport service provider of the present invention is designed to provide some transport level functionality over the VI architecture or over an architecture similar to the VI architecture without adding unnecessary overhead.

As indicated previously, the rDMA read capability is optional in the VI specification. Therefore, this exemplary embodiment of the invention is appropriate for use as a new method of rDMA read request processing in VI-enabled systems. It employs the same simple transport protocol between the host-side requesting I/O data transfers and the device-side performing the I/O data transfer operations described above. In particular, it uses the Virtual Interface's remote Direct Memory Access (rDMA) write and immediate data services on the host-side to provide the necessary I/O data transfer and completion notification. Again, the rDMA read request interface describes the data transfer from the host source buffers to the device destination buffers by using rDMA elements. The rDMA elements are embedded in a lightweight transport message as shown in FIG. 5.

Figure 11:
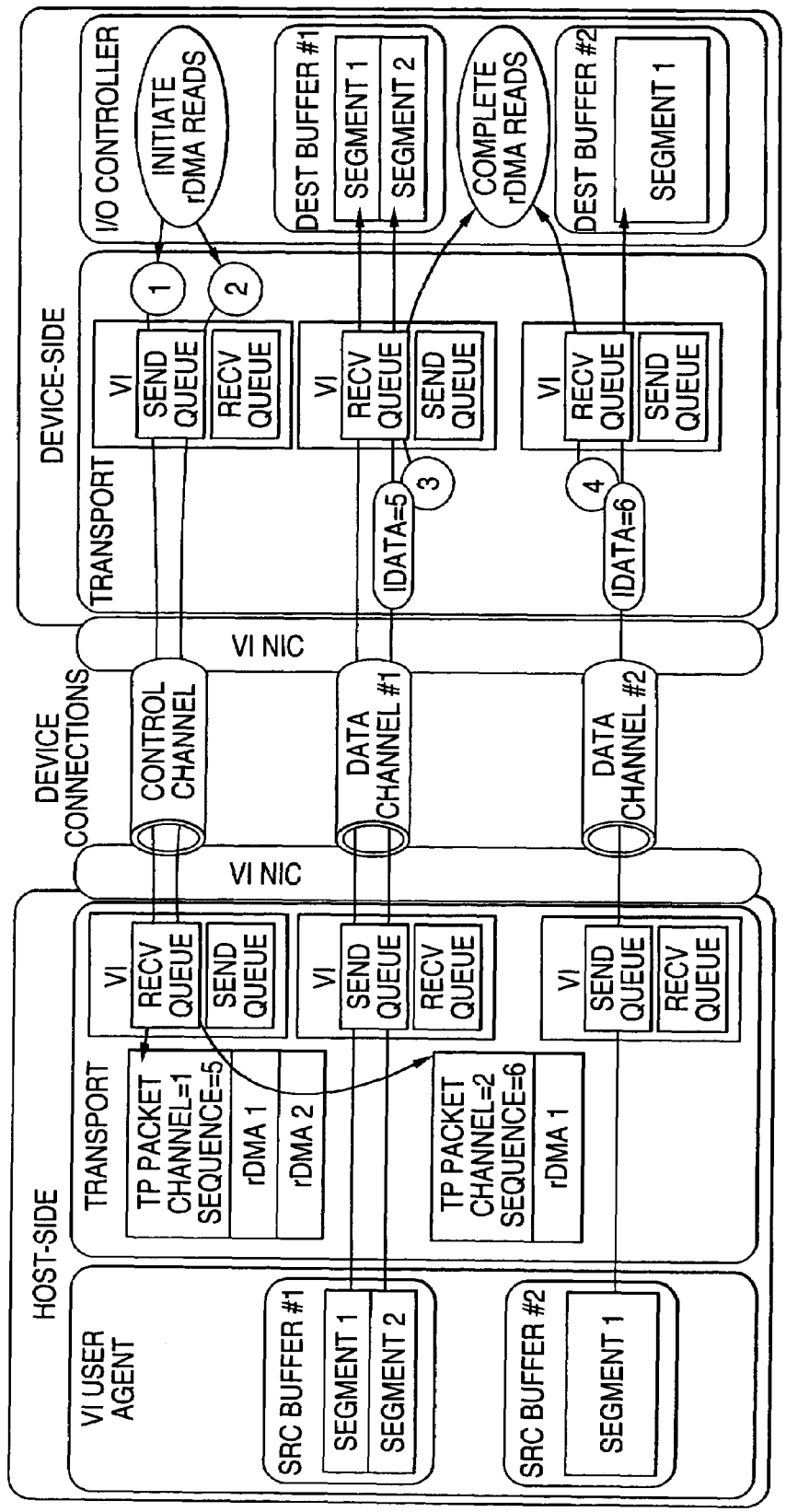
FIG. 11 illustrates the processing of rDMA according to an example embodiment of the invention implemented across a virtual interface.

The rDMA read request in this exemplary embodiment is illustrated by FIG. 11 which shows certain elements of the VI architecture used in the method with reference to FIGS. 9 and 10. To initiate a rDMA read request, a device-side I/O controller provides a set of source buffers in VI user agent 14, which reference the remote host-side memory, and a set of destination buffers in the I/O controller that reference the local device-side memory via send queues 19. These buffers are pre-registered with their respective VI network interface controller (NIC) 18 before the read request is initiated. The remote read method allows these buffers to be specified as multiple data segments with offsets and a VI channel designation, which indicates the data path. The rDMA Sequence field is used to specify the last data segment and completion of the rDMA read request. After receiving the rDMA read request, the VI user agent 14 in the host-side will schedule rDMA write transactions that are directed back to the device-side via send queues 19 of the host and receive queues 21 of the I/O device in order to complete the request.

Two separate initiated rDMA read requests are shown in FIG. 11 to help illustrate the design of the new rDMA read method. This example highlights the use of multiple segments to support scatter/gather and the use of multiple data channels that multiplex separate rDMA read transfers. The first rDMA read request (step 1) is scheduled for a first send queue 19 and Data Channel 1 and the second rDMA read request (step 2) is scheduled for a second send queue 19 and Data Channel 2 to avoid blocking and optimize performance. The rDMA read mechanism identifies each rDMA read with a unique sequence that will be used to complete the read request. The VI user agent 14 on the host-side recognizes the incoming packets on the control channel as embedded rDMA read requests and builds the proper VI rDMA write descriptors with the proper sequence inserted into the immediate data field on the last segment of each rDMA read request. The rDMA read completion for both requests are processed on the device-side, based on the immediate data that arrives with the last data segments (steps 3 and 4) of each rDMA transfer via receive queues 21. This immediate data eliminates the need for the host-side to send a data transfer acknowledgement packet back to the device-side.

This rDMA read technique provides an I/O communication mechanism that allows a remote attached I/O device to read remote host memory with minimal host-side CPU involvement using a virtual interface. It allows several multiplexed rDMA read transactions to occur across multiple VI channels to provide optimum performance and eliminate possible blocking conditions. This method gives the I/O device the flexibility to separate the large and small data transfers so that small data transfers will not be blocked behind large transfers.

The example embodiment provides the capability for multiple data segments and strict in-order delivery across each VI channel using send queues 19 and receive queues 21. The multiple data segments give I/O devices an efficient mechanism to support a typical scatter/gather list of data buffers. The in-order scheduling of the rDMA read across each channel provides a guarantee of data transfer ordering. There is no need to acknowledge the completion of the rDMA write in the exemplary embodiment since it utilizes the immediate data services provided by VI. The rDMA write completion is identified with a sequence and end of data context. Thus, the receiving I/O unit can immediately identify the completing rDMA read request without waiting for an acknowledgement packet from the host. This method eliminates an acknowledgement packet and also provides a very fast completion mechanism on the I/O unit of the receiving I/O device. Accordingly, a substantial portion of the previous inherent delays are avoided, thus achieving the advantages of the present invention.

As shown in FIG. 11, there is one control channel and two data channels. Alternatively, a single channel may be used to transmit the rDMA read message and the data across the channel adapters. Such arrangement is advantageous in that there is only a single channel, but is disadvantageous in that if a huge block of data (e.g., 2 gigabytes) is to be transmitted, such huge data block transmission will tie up the single channel, thus blocking all other messaging which can continue to operate and transmit messages across the fabric. Dual channels are generally more advantageous in that bulk data or left-over data transmission will never tie up the messaging channel.

There may also be a plurality of different data channels. With such arrangement, left-over data of a rDMA write operation can be sent over another one of the data channels. Such is advantageous in that only one data channel will be tied up transmitting any bulk or left-over data. In contrast, multiple channels can be used in parallel for faster transmission of the bulk or left-over data. More specifically, the bulk or left-over data can be striped into equally sized blocks and transmitted over various channels.

There are different possible points in the server architecture to implement the method of the present invention. The first possible implementation is in software at the VI NICs 18 of the host and the I/O device. This implementation supports the currently available NICs which do not support the NGIO standard or System I/O by allowing an NGIO communication link to be emulated in software. An example implementation of the invention uses such NICs because they are freely available and less expensive than NGIO hardware. Preferably, the method is implemented as firmware, and accelerated with hardware support. A network may of course have I/O devices implementing different embodiments of the invention. Indeed, an advantage of the exemplary embodiment of the invention is that it is particularly useful and widely adaptable to any hardware in an I/O device having latency in data transfer operations.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

The invention claimed is:

1. A method comprising:
   sending a message from a local device to a remote device, via a network, said message including a transport header indicating a message type;
   determining, at the remote device, whether the transport header of said message identifies the message as a remote Direct Memory Access (rDMA) read operation; and
   performing a remote Direct Memory Access (rDMA) write operation at the local device in accordance with data elements included in said message, if the transport header of said message identifies the message as said remote Direct Memory Access (rDMA) read operation.

2. The method as claimed in claim 1, wherein the data elements in said rDMA read message identify a set of source buffers in the remote device which reference a remote memory in the remote device and a set of destination buffers in the local device that reference a local memory in the local device.

3. The method as claimed in claim 2, wherein the source buffers and destination buffers are registered with a Virtual Interface (VI) network interface controller of the remote device and the local device, respectively.

4. The method as claimed in claim 3, wherein the data elements of the rDMA read message specify the source buffers and destination buffers as multiple data segments with offsets and designate a channel of the Virtual Interface (VI) as a data path for the rDMA write operation.

5. The method as claimed in claim 4, wherein one data element of the rDMA read message specifies a last data segment and completion of the rDMA read request.

6. The method as claimed in claim 5, wherein the data is read from the remote memory of the remote device directly into the local memory of the local device over the Virtual Interface (VI), without making an intermediate copy of the data.

7. The method as claimed in claim 6, wherein the remote device builds virtual interface rDMA write descriptors with a sequence inserted into an immediate data field on a last data segment of each rDMA read request.

8. The method as claimed in claim 7, wherein the completion of the data transfer is processed at the local device, based on the immediate data that arrives with the last data segment of each rDMA write operation by the remote device.

9. A network device initiating a method to read data in a remote memory of a remote device directly into a local memory, said network device having a network interface controller (NIC) configured to perform the following:
   receiving a message from the remote device, via a network, said message including a transport header indicating a message type;
   processing said message to determine whether the transport header of said message identifies the message as a remote Direct Memory Access (rDMA) read operation; and
   performing a remote Direct Memory Access (rDMA) write operation in accordance with data elements included in said message, if the transport header of said message identifies the message as said remote Direct Memory Access (rDMA) read operation.

10. The network device as claimed in claim 9, wherein the data elements in said rDMA read message identify a set of source buffers in the remote device which reference a remote memory in the remote device and a set of destination buffers in the local device that reference a local memory in the local device.

11. The network device as claimed in claim 10, wherein the source buffers and destination buffers are registered with the network interface controller (NIC) of the remote device and the network device, respectively.

12. The network device as claimed in claim 11, wherein the data elements of the rDMA read message specify the source buffers and destination buffers as multiple data segments with offsets and designate a channel of a Virtual Interface (VI) as a data path for the rDMA write operation.

13. The network device as claimed in claim 12, wherein one data element of the rDMA read message specifies a last data segment and completion of the rDMA read request.

14. The network device as claimed in claim 13, wherein the data is read from the remote memory of the remote device directly into the local memory of the network device over the Virtual Interface (VI), without making an intermediate copy of the data.

15. The network device as claimed in claim 14, wherein the remote device builds rDMA write descriptors with a sequence inserted into an immediate data field on the last data segment of each rDMA read request.

16. The network device as claimed in claim 15, wherein the completion of the data transfer is processed based on immediate data that arrives with the last data segment of each rDMA write operation by the remote device.

17. A tangible medium storing a plurality of program instructions, which, when executed by a processor installed in a network device causes the network device to perform the following:
   receiving a message from a remote device, via a network, said message including a transport header indicating a message type;
   processing said message to determine whether the transport header of said message identifies the message as a remote Direct Memory Access (rDMA) read operation; and
   performing a remote Direct Memory Access (rDMA) write operation in accordance with data elements included in said message, if the transport header of said message identifies that the message is said remote Direct Memory Access (rDMA) read operation.

18. The tangible medium as claimed in claim 17, wherein the data elements of the rDMA read message identify a set of source buffers in the remote device which reference a remote memory and a set of destination buffers in the network device that reference a local memory.

19. The tangible medium as claimed in claim 18, wherein the source buffers and destination buffers are registered with network interface controller (NIC) of the remote device and the network device, respectively.

20. The tangible medium as claimed in claim 19, wherein the data elements of the rDMA read message specify the source buffers and destination buffers as multiple data segments with offsets and designate a channel of a Virtual Interface (VI) as a data path for the rDMA write operation.

21. The tangible medium as claimed in claim 20, wherein one data element of the rDMA read message specifies a last data segment and completion of the rDMA read request.

22. The tangible medium as claimed in claim 21, wherein the data is read from the remote memory of the remote device directly into the local memory of the network device over a Virtual Interface (VI), without making an intermediate copy of the data.

23. The tangible medium as claimed in claim 22, wherein the remote device builds virtual interface rDMA write descriptors with a sequence inserted into an immediate data field on the last data segment of each rDMA read request.

24. The tangible medium as claimed in claim 17, wherein the completion of the data transfer is processed based on the data that arrives with the last data segment of each rDMA write operation by the remote device.

* * * * *